United States Patent [19]

Szabat et al.

[11] 4,217,247
[45] Aug. 12, 1980

[54] CATALYST SYSTEM FOR POLYURETHANE FOAMS

[75] Inventors: John F. Szabat; Gert F. Baumann, both of Pittsburgh; Gaeta L. Copeland, Eighty Four, all of Pa.

[73] Assignee: Mobay Chemical Corporation, Pittsburgh, Pa.

[21] Appl. No.: 17,997

[22] Filed: Mar. 7, 1979

[51] Int. Cl.² .............................................. B01J 27/24
[52] U.S. Cl. ........................... 252/431 C; 252/431 N; 521/116; 521/125; 521/127; 521/129
[58] Field of Search ......................... 252/431 C, 431 N

[56] References Cited

U.S. PATENT DOCUMENTS

| | | | |
|---|---|---|---|
| 3,342,757 | 9/1967 | Considine et al. | 252/431 C X |
| 3,342,758 | 9/1967 | Considine et al. | 252/431 C X |
| 3,565,825 | 2/1971 | Antelman | 252/431 C |
| 3,732,176 | 5/1973 | Hostettler et al. | 252/431 C X |
| 3,899,443 | 8/1975 | Reymore et al. | 252/431 C |

*Primary Examiner*—Patrick Garvin

*Attorney, Agent, or Firm*—Gene Harsh; Joseph C. Gil; Bruce E. Harang

[57] ABSTRACT

The instant invention is directed to a novel catalyst system for the production of polyurethane resin, and the method of use of such catalyst system. The catalyst systems of the instant invention broadly comprise
 (a) a tertiary amine,
 (b) a tin compound capable of catalyzing the reaction between an isocyanate group and an active hydrogen atom, and
 (c) a compound of the formula:

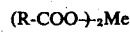

wherein Me represents calcium or barium, and
 R represents a hydrocarbon group. It has been found that the component (c) tends to catalyze side reactions which occur during foaming between isocyanate groups and the initial reaction products of isocyanates and active hydrogen containing compounds.

9 Claims, No Drawings

CATALYST SYSTEM FOR POLYURETHANE FOAMS

BACKGROUND OF THE INVENTION

Polyurethane products are produced by reacting active hydrogen containing materials with isocyanates. Their physical properties are determined by the molecular structure of the resultant polymer. Accordingly, polyurethane products having a wide variety of properties may be prepared with the use of different active hydrogen containing compounds, isocyanate compounds, and select additives. While the word polyurethane is inclusive and is used for all polymers containing urethane linkages, it should be noted that the polymers themselves usually also contain other linkages. Essentially, there are seven major types of linkages in polyurethane polymers, namely: urethane, urea, biuret, allophanate, acyl urea, uretone and isocyanurate.

The properties of urethane polymers will necessarily depend on factors such as the active hydrogen containing compound, the isocyanate type, the catalysts, the degree of cross-linking, and the processing conditions. Most of the mechanical properties will change with the molecular weight of the polymer, as well as the molecular weight per cross-link or branch point. The urethane formation reaction is excellent for extending the polymer growth, whereas, reactions forming the allophanate, biuret, and acyl urea linkages increase the molecular weight per cross-link in the polymer. With a good knowledge of the correlation between properties and polymer structure, a wide variety of urethane products can be produced and tailored to meet the requirements of many applications.

Catalysis is generally required to promote the reactions of isocyanate and compounds containing active hydrogen. The catalysts commonly employed today consist of tertiary amines such as triethylenediamine and tin catalysts such as stannous octoate. (See, e.g. U.S. Pat. Nos. 3,822,223 and 3,397,158.). At low temperatures the tertiary amine will generally promote reactions between isocyanate and water, while the tin catalysts will generally promote the reaction between isocyanates and active hydrogen atoms.

Since the role of catalysis in flexible polyether polyurethane foam preparation is well known with tin-amine catalyst systems, the changes in foam technology during recent years have generally been directed to changes in active hydrogen containing compounds and isocyanates. The flexible foams are usually made using 105–115% of the equivalent amount of isocyanate required for reaction with all the active hydrogen groups of any polyol, amine and water of the formulation, and most preferably using about 110% of the stoichiometric amount. This percentage corresponds to an isocyanate index of from 105 to 115. The isocyanate index is defined as the ratio of the amount of isocyanate actually used to the amount of isocyanate theoretically required to react with all of the active hydrogen groups. The excess of isocyanate is generally employed in the formulation to: (a) assure complete reaction of the reactants, and (b) to obtain higher load bearing properties in the foam through cross-linking reactions during foam cure. Using isocyanate concentrations in excess of 115% of equivalent amount has not been generally feasible using the tin-amide catalyst systems because it generally resulted in processing problems such as foam splits, shrinkage, inadequate cure rate, and excessive isocyanate vapors during production. Accordingly, it is evident that a catalyst system is needed that will overcome these problems by increasing the rate of reaction between the isocyanate and the active hydrogen of the initial reaction products of the reaction mixture.

Many different approaches have been made to providing such catalyst systems. Thus, it has been suggested to utilize an alkali or alkaline earth metal hydroxide, carbonate, siliconate, carboxylic acid salt or fatty acid salt in combination with a tertiary amine (see, e.g., Canadian Pat. No. 927,050). Additionally, the art has suggested a wide variety of different metal compounds for use as a catalyst including (a) combinations of an organo-alkaline earth metal with a non-aromatic tertiary chelating diamine (see, e.g., Canadian Pat. No. 827,659); (b) mixtures of mercuric salts and a basic metal compound (see, e.g., U.S. Pat. No. 3,395,108); (c) alcoholates and salts of alkaline earth and alkali metals (see, e.g., U.S. Pat. No. 3,205,201); (d) hydroxides or weak acid salts of alkali metal, alkaline earth metals or of a fully substituted quaternary ammonium, phosphonium or tertiary sulphonium radicals, in combination with tin compounds (see, e.g., U.S. Pat. No. 3,108,975); (e) mixtures of tin, lead and zinc naphthenates and octoates (see, e.g., U.S. Pat. No. 3,347,804); and (f) carboxylic acid salts of lead, mercury, tin, bismuth or antimony (see, e.g. Canadian Pat. No. 757,695). Finally, it has been proposed to combine various stannous salts such as stannous octoate, with various metallic soaps such as barium stearate, calcium stearate, calcium naphthenate, aluminum stearate, cadmium stearate and the like (see, e.g., U.S. Pat. Nos. 3,342,757 and 3,391,091). Although U.S. Pat. No. 3,342,757 indicates that calcium naphthenate, e.g., may be combined with a tertiary amine, nothing contained in the disclosure would indicate any benefit to be accomplished therefrom.

So far as Applicant is aware, the prior art does not describe the use of any barium or calcium salts of carboxylic acids, to catalyze the polyurethane reaction and, in particular, to specifically catalyze side reactions such as allophanate formation. However, barium sulfate and calcium carbonate are known as inorganic fillers for cutting costs, improving or providing appropriate physical properties in, for example, carpet-backing and in making flexible foam. In Saunders & Frisch, High Polymers, Vol. XVI, Polyurethanes, Chemistry and Technology, Part I, pp 169 ff, barium and calcium acetate are mentioned as possible catalysts for the isocyanate-hydroxyl reaction, but were found to yield gellation times in excess of 240 minutes.

DESCRIPTION OF THE INVENTION

The instant invention is thus directed to a novel catalyst system for the production of polyurethane foams of all types, including flexible, semi-flexible and rigid foams. The catalyst system of the instant invention broadly comprises a mixture of
(a) a tertiary amine,
(b) a tin compound capable of catalyzing the reaction between an isocyanate group and an active hydrogen atom, preferably selected from the group consisting of stannous salts of carboxylic acids having from 1 to 18 carbon atoms, dialkyl tin salts of carboxylic acid having from 1 to 18 carbon atoms, trialkyl tin oxides, dialkyl tin oxides and dialkyl tin chlorides, and
(c) a compound of the formula

wherein Me represents calcium or barium, and R represents a hydrocarbon group.

The use of these novel catalyst systems has been found to significantly catalyze certain side reactions occurring during the polyurethane formation and, specifically, the reactions occurring between isocyanate groups and the active hydrogen atoms formed during the initial reaction between the isocyanate group and the active hydrogen containing compounds. More specifically, it has been found that the use of component (c) significantly enhances allophanate formation.

There are numerous potential beneficial uses for the catalyst systems of the present invention. For example, in carpet-backing polyurethane foams, it is required for commercial purposes to have a minimum of 20 pounds tuft strength. With the catalyst systems of the instant invention, reproducible tuft strengths in the 25 to 30 pound range have been attained (the tuft strength is the bond between the carpet tuft and the backing).

In flexible foam slab stock production, the catalyst system of the instant invention can be used with distinct advantages. Apart from the advantage that the overall system could be considerably cheaper than the stannous octoate/amine system of the prior art, excellent processing can be achieved yielding few side splits, good bottom structure, good cell structure, and an excellent gel rate. One particularly interesting advantage is in obviating the phenomenon of varying load bearing properties (commonly measured as Indentation Load Deflection (ILD)) in a finished flexible slab stock foam depending on the humidity of the environment in which the foam is made and permitted to cure. To try to offset this effect, commercial production generally uses higher isocyanate indexes on humid days. It is impossible to determine the ILD property with certainty until some 24 to 27 hours have elapsed after the first production run. This occasionally poses production and inventory difficulties in that specific orders cannot be exactly filled. The hypothesis for explaining the unpredictability of the load bearing properties is that the uncured isocyanate groups in the risen foam react with the humidity in the air at different rates depending on weather conditions. This results in free amine groups which cannot further react into the polymer structure due to a lack of remaining free isocyanate groups. The use of the catalyst system of the invention will speed up the curing time and will minimize the dependence on this uncontrollable meteorological condition. The use will also increase the ILD or hardness of the resulting foam, since the catalyst system promotes rapid cross-linking reactions between isocyanate and the active hydrogens of the initial reaction products of isocyanates and active hydrogen containing compounds.

The use of these new catalyst systems will also aid in improving cycle times for molded flexible and rigid foams by ensuring a more complete reaction in a quicker cycle time. The catalyst systems of the invention should also increase the green strength of molded micro-cellular polyurethanes produced via the RIM process.

The instant invention also relates to the use of the novel catalyst systems of the instant invention in producing polyurethane foams.

As noted above, the catalyst system of the instant invention comprises a mixture of an amine, a tin compound, and a barium or calcium compound.

Any tertiary amine for catalyzing the reacting beween isocyanates and active hydrogen containing compounds is suitable for use in the present invention. These include triethylenediamine (DABCO); N-methylmorpholine; N-ethylmorpholine; triethylamine; N-methyl-diethanolamine; N,N-diethyl- and dimethylaminoethanol; triethanolamine; tetramethylguanidine; N,N,N',N'-tetramethylethylenediamine; N,N-dimethyl $C_{10}$–$C_{16}$ amine; N,N-dimethylcyclohexylamine; N,N-dimethylpiperazine; 1,2,4-trimethylpiperazine; bis-(2-hydroxypropyl)-2-methyl-piperazine; bis-($\beta$-dimethylaminoethyl) ether; tributylamine; N-cocomorpholine; N-methyl-N'-dimethylaminoethyl-piperazine; N,N-dimethylbenzylamine; bis(N,N-diethylaminoethyl)-adipate; N,N-diethylbenzylamine; pentamethyl-diethylenetriamine; N,N,N',N'-tetramethyl-1,3-butanediamine; N,N-dimethyl-$\beta$-phenylethylamine; 1,2-dimethylimidazole; 2-methylimidazole; pyridine and the like.

One particularly preferred embodiment of the instant invention is to utilize a mixture of (a) N,N-dimethylaminoethanol and (b) an amine selected from the group consisting of triethylenediamine, triethylamino, bis-($\beta$-dimethylaminoethyl) ether and N,N,N',N'-tetramethyl-1,3-butanediamine.

Also necessary to the catalyst system of the instant invention is a tin compound capable of catalyzing the reaction between an isocyanate group and an active hydrogen atom. Specifically, the tin compounds useful include stannous salts and dialkyl tin salts of carboxylic acids having from 1 to 18 carbon atoms, dialkyl and trialkyl tin oxides and dialkyl tin chlorides. Suitable stannous salts include stannous oleate, stannous octoate, stannous stearate, stannous acetate and the like. These stannous salts are generally known in the art and are disclosed, for example, in U.S. Pat. Nos. 3,397,158 and 3,347,804. Suitable dialkyl tin salts include essentially any of those known and used in the art. Best results are obtained if the acid portion contains from 1 to 8 carbon atoms. The two alkyl groups may be alike or different, and may contain from 1 to 18 carbon atoms. Suitable compounds include dibutyl tin diacetate, dibutyl tin diformate, dimethyl tin adipate, dibutyl tin maleate, dipropyl tin diacetate, diethyl tin diformate, dipropyl tin dioleate, dipropyl tin dipropionate, diamyl tin dipropionate, dioctyl tin diacetate, dibutyl tin dilaurate, dibutyl tin dioctoate, and the like. These materials are also generally known in the art and are described, for example, in U.S. Pat. Nos. 3,397,158 and 3,822,223. Also suitable are trialkyl tin oxides, dialkyl tin oxides and dialkyl tin chlorides. The alkyl groups or these compounds may contain from 1 to 18 carbon atoms. Examples of such compounds include tributyl tin oxide, trioctyl tin oxide, dibutyl tin oxide, dipropyl tin oxide, dibutyl tin chloride, dipropyl tin chloride, dioctyl tin chloride, and the like. The trialkyl tin oxides can be more accurately referred to as bis(trialkyl tin) oxides.

The third component of the catalyst system of the instant invention is a compound of the formula:

wherein Me represents Ca or Ba, and
R represents a hydrocarbon group, typically an aliphatic or cycloaliphatic group such as alkyl, alkenyl, and the like, and corresponding cyclic groups such as cycloalkyl, etc. groups; an aryl group such as phenyl, substituted phenyls, naphthyl, etc.; an aralkyl group such as benzyl, styryl, cinnamyl, etc.; an alkaryl group such as tolyl, xylyl, etc.; a cycloaliphatic group such as a naphthenic group; etc. Other equivalent groups may be employed. Preferably the acid is monobasic. In the preferred embodiment, R may be an alkyl group having less than about 20 carbon atoms. Typical of the acids from which the materials may be prepared include acetic acid, propionic acid, butyric acid, caproic acid, caprylic acid, capric acid, stearic acid, oleic acid, etc. Naphthenic acid may also be employed. The commercially-occurring mixture of acids known as tall oil fatty acids may also be employed.

Typical examples of useful materials include calcium naphthenate, calcium stearate, barium stearate, calcium octoate, barium acetyl acetonate, barium neodecanoate, barium octoate, barium naphthenate, calcium linoleate, calcium neodecanoate and the like. Again, these materials are generally known and are described in U.S. Pat. No. 3,342,757 and 3,391,091. The presently preferred material is barium naphthenate.

The catalyst system of the instant invention may generally be produced by merely mixing the three components. However, this is generally not preferred since the three components may not be miscible. Accordingly, it is generally preferred to add the three components separately to the polyurethane reaction mixture. In general, the amounts of the three components are as follows:

(a) component (a) ranges from 0.02 to 3 parts by weight based on 100 parts by weight of active hydrogen containing material, and preferably ranges from 0.05 to 1.0 parts by weight, (b) component (b) ranges from 0.02 to 2 parts by weight based on 100 parts by weight of active hydrogen containing material, and preferably ranges from 0.1 to 0.8 parts by weight, and (c) component (c) ranges from 0.0045 to 3 parts by weight based on 100 parts by weight of active hydrogen containing material, and preferably ranges from 0.045 to 1.5 parts by weight. In many cases, the tin catalysts and/or the component (c) are provided in inert solvents such as dioctyl phthalate, naphthenic acid, mineral spirits, and the like. The above ranges are based on the amounts of materials used exclusive of such inert solvents.

As hereinbefore noted, the catalyst systems of the instant invention are eminently suitable for the production of isocyanate polyaddition resins from polyisocyanate and active hydrogen containing materials.

The polyisocyanates useful as starting components for the production of such resins using the novel catalyst system according to the present invention may be any aliphatic, cycloaliphatic, araliphatic, aromatic or heterocyclic polyisocyanates, such as those described, for example, by W. Siefken in Justus Liebigs Annalen der Chemie, 562, pages 75 to 136. These include, for example, ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and 1,4-diisocyanate and mixtures of these isomers; 1-isocyanato-3,3,5-trimethyl-5-isocyanatomethylcyclohexane (U.S. Pat. No. 3,401,190); hexahydrotolylene-2,4- and -2,6-diisocyanate and mixtures of these isomers; hexahydrophenylene-1,3- and/or 1,4-diisocyanate; perhydrodiphenylmethane-2,4'- and/or 4,4'-diisocyanate; phenylene-1,3- and -1,4-diisocyanate; tolylene-2,4- and -2,6-diisocyanate and mixtures of these isomers; diphenylmethane-2,4'- and/or 4,4'-diisocyanate; naphthylene-1,5-diisocyanate; triphenylmethane-4,4',4"-triisocyanate; polyphenyl-polymethylene polyisocyanate which may be obtained by aniline/formaldehyde condensation followed by phosgenation and which have been described, for example, in British Pat. Nos. 874,430 and 848,671; m- and p-isocyanato-phenylsulphonylisocyanates according to U.S. Pat. No. 3,454,606; perchlorinated aryl polyisocyanates as described, e.g. in U.S. Pat. No. 3,277,138; polyisocyanates containing carbodiimide groups as described in U.S. Pat. No. 3,152,162; the diisocyanates described in U.S. Pat. No. 3,492,330; polyisocyanates containing allophanate groups as described, e.g.: in British Pat. No. 994,890, Belgian Pat. No. 761,626 and published Dutch Patent Application 7,102,524; polyisocyanates containing isocyanurate groups as described, e.g. in U.S. Pat. No. 3,001,973, in German Pat. Nos. 1,022,789; 1,222,067 and 1,027,394 and in German Offenlegungsschriften Nos. 1,929,034 and 2,004,048; polyisocyanates containing urethane groups as described, e.g. in Belgian Pat. No. 752,261 or in U.S. Pat. No. 3,394,164; polyisocyanates containing acylated urea groups according to German Pat. No. 1,230,778; polyisocyanates containing biuret groups as described, e.g. in German Pat. No. 1,101,394 (U.S. Pat. Nos. 3,124,605 and 3,201,372) and in British Pat. No. 889,050; polyisocyanates prepared by telomerization reactions as described, e.g. in U.S. Pat. No. 3,654,106, polyisocyanates containing ester groups as mentioned, for example, in British Pat. Nos. 965,474 and 1,072,956, in U.S. Pat. No. 3,567,763 and in German Pat. No. 1,231,688; reaction products of the above-mentioned isocyanates with acetals according to German Pat. No. 1,072,385; and polyisocyanates containing polymeric fatty acid groups according to U.S. Pat. No. 3,455,883.

The distillation residues obtained from the commercial production of isocyanates which still contain isocyanate groups may also be used, optionally dissolved in one or more of the above-mentioned polyisocyanates. Mixtures of the above-mentioned polyisocyanates may also be used.

The commercially readily available polyisocyanates are generally preferred. These include, for example, tolylene-2,4- and -2,6-diisocyanate and mixtures of these isomers ("TDI"); polyphenylpolymethylene polyisocyanates, which may be obtained by aniline/formaldehyde condensation followed by phosgenation ("crude MDI"); and polyisocyanates containing carbodiimide groups, urethane groups, allophanate groups, isocyanurate groups, urea groups or biuret groups ("modified polyisocyanates").

The starting components used for the production of isocyanate polyaddition resins with the aid of the novel catalyst systems according to the present invention also include compounds which contain at least two hydrogen atoms capable of reacting with isocyanates and which generally have a molecular weight of from about 400 to about 10,000. These may be compounds containing amino groups, thiol groups or carboxyl groups, but are preferably polyhydroxyl compounds, and in particular compounds having from 2 to 8 hydroxyl groups and especially those having a molecular weight of from 800 to 10,000 and preferably from 1000 to 7000. These include, for example, polyesters, polyethers, polythioethers, polyacetals, polycarbonates and polyester amides containing at least 2, generally from 2 to 8 and preferably from 2 to 4 hydroxyl groups, such as those known for the production of both homogeneous and cellular polyurethanes.

The hydroxyl group-containing polyesters used may be, for example, reaction products of polyhydric, preferably dihydric alcohols, optionally with the addition of trihydric alcohols, and polybasic, preferably dibasic carboxylic acids. Instead of using the free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. with halogen atoms, and/or be unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethylterephthalate and terephthalic acid-bis-glycol esters. Suitable polyhydric alcohols include, e.g. ethylene glycol; propylene glycol-(1,2) and -(1,3); butylene glycol-(1,4) and -(2,3); hexanediol-(1,6); octanediol-(1,8); neopentyl glycol; cyclohexane dimethanol (1,4-bis-hydroxymethylcyclohexane); 2-methyl-1,3-propanediol; glycerol; trimethylolpropane; hexanetriol-(1,2,6); butanetriol-(1,2,4); trimethylolethane; pentaerythritol; guinitol; mannitol and sorbitol; methylglycoside; diethylene glycol; triethylene glycol; tetraethylene glycol; polyethylene glycols; dipropylene glycol; polypropylene glycols; dibutylene glycol and polybutylene glycols. The polyesters may also contain carboxyl end groups. Polyesters of lactones, such as ε-caprolactone, and hydroxycarboxylic acids, such as ω-hydroxycaproic acid, may also be used.

The polyethers used according to the present invention which contain at least 2, generally from 2 to 8 and preferably 2 or 3 hydroxyl groups are known. They may be prepared, for example, by the polymerization of epoxides, such as ethylene oxide, propylene oxide, butylene oxide, tetrahydrofuran, styrene oxide or epichlorohydrin, either each on its own, (e.g. in the presence of $BF_3$), or by chemical addition of these epoxides, optionally as mixtures or successively, to starting components having reactive hydrogen atoms, such as water, alcohols or amines, e.g. ethylene glycol, propylene glycol-(1,3) or -(1,2), trimethylol propane, 4,4'-dihydroxydiphenylpropane, aniline, ammonia, ethanolamine or ethylenediamine. Sucrose polyethers which have been described, for example, in German Auslegeschriften Nos. 1,176,358 and 1,064,938 may also be used according to the present invention. It is frequently preferred to use polyethers which contain predominantly primary OH groups (up to 90%, by weight, based on all the OH groups present in the polyether). Polyethers which have been modified with vinyl polymers, for example the compounds obtained by the polymerization of styrene and acrylonitrile in the presence of polyethers (U.S. Pat. Nos. 3,383,351; 3,304,273; 3,523,093 and 3,110,695 and German Pat. No. 1,152,536) are also suitable. Polybutadienes containing OH groups may also be used.

Among the polythioethers which should be particularly mentioned are the condensation products obtained from thiodiglycol on its own and/or with other glycols, dicarboxylic acids, formaldehyde, aminocarboxylic acids or amino alcohols. The products obtained are polythio mixed ethers, polythio ether esters or polythioether ester amides, depending on the co-components.

Suitable polyacetals include, e.g. the compounds which may be obtained from glycols, such as diethylene glycol, triethylene glycol, 4,4'-dioxethoxy-diphenyldimethylmethane or hexanediol, and formaldehyde. Polyacetals suitable for the purpose of the present invention may also be prepared by polymerizing cyclic acetals.

Suitable polycarbonates containing hydroxyl groups are known and may be prepared, for example, by the reaction of diols, such as propanediol-(1,3), butanediol-(1,4) and/or hexanediol-(1,6), diethylene glycol, triethylene glycol or tetraethyleneglycol, with diarylcarbonates, e.g. diphenyl carbonate, or phosgene.

Suitable polyester amides and polyamides include, e.g. the predominantly linear condensates obtainable from polybasic saturated and unsaturated carboxylic acids or their anhydrides and polyvalent saturated and unsaturated amino alcohols, diamines, polyamines or mixtures thereof.

Polyhydroxyl compounds already containing urethane or urea groups as well as modified or unmodified natural polyols, such as castor oil, carbohydrates or starch may also be used. Additionally, products of alkylene oxides and phenol/formaldehyde resins or of alkylene oxides and urea/formaldehyde resins are also suitable according to the present invention.

Representatives of these compounds which may be used according to the present invention have been described, e.g. in High Polymers, Vol. XVI, "Polyurethanes, Chemistry and Technology", by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Höchtlen, Carl-Hanser-Verlag, Munich, 1966, e.g. on pages 45 to 71.

Mixtures of the above-mentioned compounds containing at least two hydrogen atoms capable of reacting with isocyanates and having a molecular weight of from about 400 to about 10,000 may, of course, also be used, e.g. mixtures of polyethers and polyesters.

The starting components used according to the present invention optionally also include compounds having a molecular weight of from 32 to about 400 which contain at least two hydrogen atoms capable of reacting with isocyanates. These are also compounds containing hydroxyl groups and/or amino groups and/or thiol groups and/or carboxyl groups, preferably compounds containing hydroxyl groups and/or amino groups. They serve as chain lengthening agents or cross-linking agents. They generally contain from 2 to 8 hydrogen atoms capable of reacting with isocyanates, preferably 2 or 3 such hydrogen atoms. The following are mentioned as examples of such compounds: ethylene glycol; propylene glycol-(1,2) and -(1,3); butylene glycol-(1,4) and -(2,3); pentanediol-(1,5); hexanediol-(1,6); octanediol-(1,8); neopentylglycol; 1,4-bis-hydroxymethylcyclohexane; 2-methyl-1,3-propanediol; glycerol; trimethylolpropane; hexanetriol-(1,2,6); trimethylolethane; pentaerythritol; quinitol; mannitol and sorbitol; diethylene glycol; triethylene glycol; tetraethylene glycol; polyethylene glycols having a molecular weight of up to 400; dipropylene glycol, polypropylene glycols having a molecular weight of up to 400; dibutylene glycol; polybutylene glycols having a molecular weight of up to 400; 4,4'-dihydroxy-diphenylpropane; dihydroxymethylhydroquinone; ethanolamine; diethanolamine; triethanolamine; 3-aminopropanol; ethylenediamine; 1,3-diaminopropane; 1-mercapto-3-aminopropane; 4-hydroxyphthalic acid or 4-aminophthalic acid; succinic acid; adipic acid; hydrazine; N,N'-dimethylhydrazine and 4,4'-diaminodiphenylmethane.

Here again, mixtures of various compounds having a molecular weight of from 32 to 400 and containing at least two hydrogen atoms capable of reacting with isocyanate may be used.

Production of the isocyanate polyaddition resins with the aid of the novel catalyst systems according to the present invention is frequently carried out with the use of water and/or readily volatile organic substances as blowing agents. Suitable organic blowing agents include, e.g. acetone; ethyl acetate; halogenated alkanes, such as methylene chloride, chloroform, ethylidene chloride, vinylidene chloride, monofluorotrichloromethane, chlorodifluoromethane or dichlorodifluoromethane; butane; hexane; heptane or diethylether. The effect of a blowing agent may also be obtained by adding compounds which decompose at temperatures above room temperature to liberate gases, such as nitrogen, e.g. azo compounds, such as azoisobutyric acid nitrile. Other examples of blowing agents and details about the use of blowing agents may be found in Kunststoff-Handbuch, Volume VII, published by Vieweg and Höchtlen, Carl-Hanser-Verlag, Munich, 1966, e.g. on pages 108 and 109, 453 to 455 and 507 to 510.

Other known catalysts may, of course, be used in addition to the catalyst combinations according to the present invention, particularly if particular effects may thereby by obtained.

Silaamines having carbon-silicon bonds as described, e.g. U.S. Pat. No. 3,620,984 may also be used as additional catalysts, for example, 2,2,4-trimethyl-2-silamorpholine and 1,3-diethylaminomethyltetramethyldisiloxane.

Production of the polyurethane resins with the aid of the new catalyst combinations according to the present invention may also be carried out with the addition of surface active agents (emulsifiers and/or foam stabilizers).

Suitable emulsifiers include, e.g., the sodium salts of ricinoleic sulphonates or salts of fatty acids and amines, such as oleic acid diethylamine or stearic acid diethanolamine. Alkali metal or ammonium salts of sulphonic acids, such as dodecylbenzene sulphonic acid or dinaphthylmethane disulphonic acid, or of fatty acids, such as ricinoleic acid, or of polymeric fatty acids may also be used as surface active additives.

The foam stabilizers used are mainly polyether siloxanes, especially those which are water-soluble. These compounds generally have a polydimethylsiloxane group attached to a copolymer of ethylene oxide and propylene oxide. Foam stabilizers of this type have been described, for example, in U.S. Pat. Nos. 2,834,748; 2,917,480 and 3,629,308.

According to the present invention reaction retarders may also be added e.g. compounds which are acid in reaction, such as hydrochloric acid or organic acid halides. Known cell regulators, such as paraffins or fatty alcohols or dimethylpolysiloxanes; pigments; dyes; known flame retarding agents, such as trischloroethylphosphate, tricresylphosphate or ammonium phosphate or polyphosphate; stabilizers against ageing and weathering; plasticizers; fungistatic and bacteriostatic substances; and fillers, such as barium sulphate, kieselguhr; carbon black or whiting may also be used.

Other examples of surface active additives, foam stabilizers, cell regulators, reaction retarders, stabilizers, flame retarding substances, plasticizers, dyes, fillers and fungistatic and bacteriostatic substances which may also be used according to the present invention and details concerning the use and action of these additives may be found in Kunststoff-Handbuch, Volume VII, published by Vieweg and Höchtlen, Carl-Hanser-Verlag, Munich 1966, e.g. on pages 103 to 113.

The various amounts of materials, aside from the catalyst system itself, is dependent upon the ultimate product desired, and may, accordingly, be varied widely in manners known and used in the art.

According to the present invention, the components are reacted together by the known one-shot process, in many cases using mechanical devices, such as those described in U.S. Pat. No. 2,764,565. Details about processing apparatus which may also be used according to the present invention may be found in Kunststoff Handbuch, Volume VII, published by Vieweg and Höchtlen, Carl-Hanser-Verlag, Munich 1966, e.g. on pages 121 to 205. As is known in the art, in a one-shot process, either all the components (both reactive and non-reactive) are mixed at one time, or the non-reactive components are first mixed with the active hydrogen containing materials and the resultant pre-mix is then mixed with the isocyanate component.

For producing foams according to the present invention, the foaming reaction may be carried out inside molds. The reaction mixture is introduced into a mold made of a metal, such as aluminum, or of a synthetic material, such as an epoxide resin. The reaction mixture foams inside the mold to form the shaped product. This process of foaming in molds may be carried out to produce a product having a cellular structure on its surface or it may be carried out to produce a product having a non-cellular skin and cellular center. According to the present invention, the desired result may be obtained by either introducing just sufficient foamable reaction mixture into the molds to fill the mold with foam after the reaction or introducing a larger quantity of foamable reaction mixture, in which case the process is said to be carried out under conditions of overcharging, a procedure which has already been disclosed, for example, in U.S. Pat. Nos. 1,178,490 and 3,182,104.

When foaming is carried out in molds, so-called "external mold release agents", such as silicone oils, are frequently used, but so-called "internal mold release agents" may also be used, optionally in combination with external mold release agents, for example those disclosed in German Offenlegungsschriften Nos. 2,121,670 and 2,307,589.

Cold setting foams may also be produced according to the present invention (see British Pat. No. 1,162,517, German Offenlegungsschrift No. 2,153,086).

On the other hand, foams may, of course, be produced by the process of block foaming or by the known laminator process.

The following Examples serve to illustrate the invention. The figures quoted represent parts by weight or percentages by weight unless otherwise indicated.

In the Examples which follow, the following designations have been used:

POLYETHER I is MULTRANOL ® 7100 which is a high molecular weight branched polypropylene glycol modified with ethylene oxide having an OH number of 49 and commercially available from MOBAY CHEMICAL CORPORATION.

POLYETHER II is MULTRANOL ® 3900 which is a polypropylene glycol modified with ethylene oxide, having an OH number of 35 and an average molecular weight of 4800, and commercially available from MOBAY CHEMICAL CORPORATION.

ISOCYANATE I is a blend of 80% 2,4-tolylene diisocyanate and 20% 2,6-tolylene diisocyanate.

AMINE I is a proprietary blend containing N,N-dimethylamino ethanol, and a piperazine derivative. The blend is commercially available from MOBAY as CATALYST E-9400.

AMINE II is N,N-dimethylamino ethanol.

AMINE III is bis-(2-dimethylamino ethyl) ether.

TIN I is stannous octoate.

TIN II is a blend containing 25% stannous octoate and 75% dioctyl phthalate.

METAL I is a mixture of barium naphthenate and naphtha solvent where the total barium content is 5% by weight.

METAL II is a mixture of barium naphthenate and naphthenic acid where the total barium content is 10% by weight.

METAL III is a mixture of calcium octoate and naphtha solvent, where the total calcium content is 5% by weight.

METAL IV is barium acetylacetonate.

METAL V is a mixture of barium neodecanoate and naphtha solvent where the total barium content is 5% by weight.

METAL VI is a mixture of barium octoate and naphtha solvent where the total barium content is 15% by weight.

METAL VII is a mixture of calcium naphthenate and naphtha solvent where the total calcium content is 4% by weight.

METAL VIII is a mixture of calcium neodecanoate and naphtha solvent where the total calcium content is 5% by weight.

METAL IX is calcium linoleate.

METAL X is calcium octoate.

ADDITIVE I is L-6202, a silicone surfactant commercially available from Union Carbide Corporation.

ADDITIVE II is L-548, a siloxane surfactant commercially available from Union Carbide Corporation.

EXAMPLES

EXAMPLES 1 THROUGH 5

The materials and amounts of materials used in parts by weight in these Examples were as set forth in TABLE I. The procedure used was as follows:

The polyether was charged to a one quart cardboard container. Thereafter, the following materials were added in sequence - water, ADDITIVE, AMINE (when used), TIN (when used), and METAL (when used). The ingredients were stirred with an air driven stirrer set at 1500 revolutions per minute for 15 seconds. ISOCYANATE was then added to the container and the ingredients were stirred with an air driven stirrer set at 1500 revolutions per minute for 12 seconds. The mixture was then poured into a 6"×8"×12" box and allowed to foam. The cream time, rise time and set time were noted and were as indicated in TABLE I. These times denote the following:

CREAM TIME is the elapsed time from the start of mix time (i.e., when ISOCYANATE is mixed with the other ingredients) until the onset of foaming, which onset is evident by a change in the color of the reaction mixture, i.e. from brown to creamy tan.

RISE TIME is the elapsed time from the start of mix time until the time at which no additional visible foam rise can be observed.

SET TIME is the elapsed time from the end of the rise time until the onset of thermosetting in the foamed polymer, which onset is noted by placing a tongue depressor into the foam to a depth of ½ inch and moving the depressor gently back and forth; when thermosetting occurs there will be resistance to tearing action and the depressor cannot be easily moved back and forth.

TABLE I

| Example Materials | 1 | 2 | 3 | 4 | 5 |
|---|---|---|---|---|---|
| Polyether I | 100 | 100 | 100 | 100 | 100 |
| Water | 4.0 | 4.0 | 4.0 | 4.0 | 4.0 |
| Additive I | 0.80 | 0.80 | 0.80 | 0.80 | 0.80 |
| Tin I | 0.18 | 0.18 | — | — | 0.18 |
| Amine I | — | 0.12 | 0.12 | — | 0.12 |
| Metal I | — | — | 0.18 | 0.18 | 0.18 |
| Isocyanate I | 51.19 | 51.19 | 51.19 | 51.19 | 51.19 |
| Cream Time | 32 seconds | 15 seconds | 21 seconds | 33 seconds | 16 seconds |
| Rise Time | 162 seconds | 85 seconds | After 5 min. the foam had not set up. | This foam did not set up after 15 min. and collapsed after 17 min. | 87 seconds |
| Set Time | 30 seconds | 34 seconds | | | 17 seconds |
| Comments | Only rose about 1", while the foam of Ex. 2 rose to 10". | Normal rise height. Foam had large surface splits. | It did rise about ¾ the way up the box. Completely collapsed at 9 min. | | Normal rise height. Large split at surface. |

EXAMPLES 6 THROUGH 8

The materials and amounts of materials used in parts by weight were as set forth in TABLE II. The procedure used was as follows:

Foam slabs were produced using a Hennecke high pressure foam machine model UBT-65. Five and six, in the case of Examples 7 and 8, separate streams were continuously metered to the mixing chamber of the machine which was stirring at a rate of 3500 revolutions per minute. The polyether and isocyanate streams were metered by HY-radial piston pumps while the remaining streams were metered using Bosch fuel injection pumps. The remaining streams consisted of (a) water and amine, (b) tin, (c) metal (when used), and (d) additive. The mixed material was deposited on a moving conveyor belt provided with side guides, and bottom and side papers, and was allowed to foam. The bottom and side papers were stripped after the foam slab had been produced. The foam slabs measured 40 inches wide by 30 inches high by 20 feet long. The cream time, rise time and set time were noted and were as indicated in TABLE II. Finally, the finished products were tested for the various physical properties noted in TABLE II pursuant to ASTM D-3574. Example 6 is a comparison example.

TABLE II

| Ingredient | Example 6 | Example 7 | Example 8 |
|---|---|---|---|
| Polyether I | 100 | 100 | 100 |
| Isocyanate I | 49 | 49 | 49 |
| Water | 4 | 4 | 4 |
| Amine I | 0.12 | 0.12 | 0.12 |
| Tin II | 0.88 | 0.75 | 0.66 |
| Metal I | — | 0.5 | 1.0 |
| Additive II | 0.8 | 0.8 | 0.8 |
| Cream Time, seconds | 8 | 7 | 7 |
| Rise Time, seconds | 80 | 89 | 89 |
| Set Time, seconds | 17 | 6 | 8 |
| Density, KG/M$^3$ | 23 | 23 | 23 |
| Elongation % | 241 | 273 | 307 |
| Air Flow, dm$^3$/sec | 1.8 | 0.8 | 1.0 |
| 22 HR/90% Compression set, % | 5 | 7 | 7 |
| IFD (102 mm), N/323 cm$^2$ | | | |
| @ 25% R Deflection | 141 | 124 | 133 |
| @ 65% R Deflection | 278 | 237 | 241 |

EXAMPLES 9 THROUGH 36

The materials and amounts of materials used in parts by weight were as set forth in TABLE III. The procedure used was identical to that used in Examples 1 through 5. In general, the formulations were varied as to their isocyanate content, or in other words, their isocyanate index. In general, the catalytic effect of the catalyst system of the invention is observed when the set times do not increase for a given formulation with a higher isocyanate index. Accordingly, if, as the isocyanate index increases for a given formulation, the set times noted also increase, then the catalyst agent tested is not effectively catalyzing the crosslinking reaction (i.e. the reaction between the isocyanate groups and active hydrogens resulting from the initial reaction of isocyanates and active hydrogen containing compounds). In the examples, the cream time was not noted. Examples 9 through 24 are comparison examples.

TABLE III

| | 9 | 10 | 11 | 12 | 13 | 14 | 15 | 16 | 17 | 18 | 19 | 20 | 21 | 22 |
|---|---|---|---|---|---|---|---|---|---|---|---|---|---|---|
| Polyether I | 100 | → | → | → | → | → | → | → | → | → | → | → | → | → |
| Additive I | 0.8 | → | → | → | → | → | → | → | → | → | → | → | → | → |
| Water | 3.0 | → | → | → | → | → | → | → | → | → | → | → | → | → |
| Amine I | 0.08 | → | → | → | → | → | → | → | → | → | → | → | → | → |
| Tin I | 0.16 | → | → | → | 0.18 | → | → | → | 0.20 | → | → | → | 0.22 | → |
| Amine II | — | — | — | — | — | — | — | — | — | — | — | — | — | — |
| Amine III | — | — | — | — | — | — | — | — | — | — | — | — | — | — |
| Metal II | — | — | — | — | — | — | — | — | — | — | — | — | — | — |
| Isocyanate I | 40.4 | 44.1 | 47.8 | 51.4 | 40.4 | 44.1 | 47.8 | 51.4 | 40.4 | 44.1 | 47.8 | 51.4 | 40.4 | 44.1 |
| Isocyanate Index | 110 | 120 | 130 | 140 | 110 | 120 | 130 | 140 | 110 | 120 | 130 | 140 | 110 | 120 |
| Rise Time, sec. | 176 | 145 | 132 | 140 | 153 | 136 | 129 | 133 | 134 | 121 | 130 | 118 | 135 | 118 |
| Set Time, sec. | 39 | 53 | 81 | 68 | 38 | 43 | 56 | 50 | 27 | 34 | 43 | 58 | 26 | 30 |

| | 23 | 24 | 25 | 26 | 27 | 28 | 29 | 30 | 31 | 32 | 33 | 34 | 35 | 36 |
|---|---|---|---|---|---|---|---|---|---|---|---|---|---|---|
| Polyether I | → | → | 100 | → | → | → | → | → | → | → | → | → | → | → |
| Additive I | → | → | 1 | → | → | → | → | → | → | → | → | → | → | → |
| Water | → | → | 3.0 | → | → | → | → | → | → | → | → | → | → | → |
| Amine I | → | → | 0.05 | → | → | → | → | → | → | → | → | → | → | → |
| Tin I | → | → | 0.18 | → | → | → | → | → | → | → | → | → | → | → |
| Amine II | — | — | 0.20 | → | → | → | → | → | → | → | → | → | → | → |
| Amine III | — | — | — | — | — | — | — | — | — | 0.05 | 0.05 | 0.05 | 0.05 | |
| Metal II | — | — | 0.5 | → | → | → | 1.0 | → | → | → | 0.5 | → | → | → |
| Isocyanate I | 47.8 | 51.4 | 40.4 | 44.1 | 47.8 | 51.4 | 40.4 | 44.1 | 47.8 | 51.4 | 40.4 | 44.1 | 47.8 | 51.4 |
| Isocyanate Index | 130 | 140 | 110 | 120 | 130 | 140 | 110 | 120 | 130 | 140 | 110 | 120 | 130 | 140 |
| Rise Time, sec. | 115 | 122 | 126 | 120 | 118 | 80 | 140 | 114 | 116 | 118 | 102 | 111 | 91 | 111 |
| Set Time, sec. | 44 | 31 | 12 | 12 | 9 | 4 | 9 | 5 | 4 | 5 | 8 | 4 | 10 | 5 |

EXAMPLES 37 THROUGH 64

The materials and amounts of materials used in parts by weight were as set forth in TABLE IV. The procedure used was identical to Examples 1 through 5 except that cream times were not noted.

TABLE IV

| Ingredient | 37 | 38 | 39 | 40 | 41 | 42 | 43 | 44 | 45 | 46 | 47 | 48 | 49 | 50 |
|---|---|---|---|---|---|---|---|---|---|---|---|---|---|---|
| Polyether II | 100 | → | → | → | → | → | → | → | → | → | → | → | 100 | → |
| Additive I | 1 | → | → | → | → | → | → | → | → | → | → | → | 1 | → |
| Amine I | 0.05 | → | → | → | → | → | → | → | → | → | → | → | 0.05 | → |
| Amine II | 0.20 | → | → | → | → | → | → | → | → | → | → | → | 0.20 | → |
| Amine III | — | — | — | — | — | — | — | — | 0.05 | → | → | → | — | — |
| Tin I | 0.15 | → | → | → | → | → | → | → | → | → | → | → | 0.10 | → |

TABLE IV-continued

| | | | | | | | | | | | | | | |
|---|---|---|---|---|---|---|---|---|---|---|---|---|---|---|
| Metal II | 0.5 | → | → | → | 1.0 | → | → | → | 0.5 | → | → | → | 0.50 | → |
| Metal III | — | — | — | — | — | — | — | — | — | — | — | — | — | — |
| Water | 3.0 | → | → | → | → | → | → | → | → | → | → | → | 3.0 | → |
| Isocyanate I | 39.6 | 44.8 | 48.2 | 51.7 | 39.6 | 44.8 | 48.2 | 51.7 | 39.6 | 44.8 | 48.2 | 51.7 | 39.6 | 44.8 |
| Isocyanate Index | 115 | 130 | 140 | 150 | 115 | 130 | 140 | 150 | 115 | 130 | 140 | 150 | 115 | 130 |
| Rise Time, sec. | 109 | 106 | 90 | 93 | 114 | 84 | 87 | 83 | 105 | 104 | 84 | 83 | 152 | 151 |
| Set Time, sec. | 36 | 24 | 14 | 9 | 22 | 22 | 16 | 11 | 13 | 35 | 8 | 9 | 13 | 9 |

| Ingredient | Example | | | | | | | | | | | | | |
|---|---|---|---|---|---|---|---|---|---|---|---|---|---|---|
| | 51 | 52 | 53 | 54 | 55 | 56 | 57 | 58 | 59 | 60 | 61 | 62 | 63 | 64 |
| Polyether II | → | → | → | → | → | → | → | → | → | → | 100 | → | → | → |
| Additive I | → | → | → | → | → | → | → | → | → | → | 1 | → | → | → |
| Amine I | → | → | → | → | → | → | → | → | → | → | 0.05 | → | → | → |
| Amine II | → | → | → | → | → | → | → | → | → | → | — | — | — | — |
| Amine III | → | → | → | → | → | → | 0.05 | → | → | → | 0.05 | → | → | → |
| Tin I | → | → | → | → | → | → | → | → | → | → | 0.15 | → | → | → |
| Metal II | → | → | 1.0 | → | → | → | 0.50 | → | → | → | — | — | — | — |
| Metals III | — | — | — | — | — | — | — | — | — | — | 0.50 | → | → | → |
| Water | → | → | → | → | → | → | → | → | → | → | 3.0 | → | → | → |
| Isocyanate I | 48.2 | 51.7 | 39.6 | 44.8 | 48.2 | 51.7 | 39.6 | 44.8 | 48.2 | 51.7 | 39.6 | 44.8 | 48.2 | 51.7 |
| Isocyanate Index | 140 | 150 | 115 | 130 | 140 | 150 | 115 | 130 | 140 | 150 | 115 | 130 | 140 | 150 |
| Rise Time, sec. | 121 | 156 | 165 | 151 | 135 | 136 | 130 | 118 | 115 | 190 | 130 | 131 | 125 | 125 |
| Set Time, Sec. | 9 | 11 | 5 | 3 | 2 | 2 | 9 | 9 | 6 | 6 | 39 | 29 | 32 | 19 |

EXAMPLES 65 THROUGH 71

In these Examples, the formulations consisted of 100 parts of POLYETHER I, 1 part of ADDITIVE I, 0.05 parts of AMINE I, 0.20 parts of AMINE II, 0.05 parts of AMINE III, 0.18 parts of TIN I, 3 parts of water, 0.50 parts of the specific METAL noted in TABLE V and ISOCYANATE I in varying amounts for each formulation. ISOCYANATE I was used in amounts of 40.4, 44.1, 47.8 and 51.4 corresponding respectively to isocyanate indexes of 110, 120, 130 and 140.

The foams were prepared identically to those prepared in Examples 1 through 5. The cream times, rise times and set times noted were as indicated in TABLE V.

TABLE V

| Example | 65 | 66 | 67 | 68 | 69 | 70 | 71 |
|---|---|---|---|---|---|---|---|
| Metal | IV | V | IX | VII | VIII | VI | X |
| Index | CREAM TIMES, SECONDS | | | | | | |
| 110 | 12 | 9 | 14 | 10 | 15 | 13 | 13 |
| 120 | 9 | 9 | 11 | 10 | 13 | 13 | 13 |
| 130 | 9 | 9 | 10 | 10 | 14 | 12 | 14 |
| 140 | 9 | 9 | 10 | 12 | 13 | 12 | 15 |
| Index | RISE TIMES, SECONDS | | | | | | |
| 110 | 93 | 137 | 135 | 130 | 146 | 132 | 142 |
| 120 | 90 | 125 | 126 | 122 | 131 | 134 | 139 |
| 130 | 87 | 126 | 104 | 125 | 135 | 135 | 180 |
| 140 | 100 | 145 | 100 | 125 | 115 | 128 | 150 |
| Index | SET TIMES, SECONDS | | | | | | |
| 110 | 17 | 8 | 29.4 | 21 | 18 | 11.4 | 8.8 |
| 120 | 12 | 16 | 31.2 | 18 | 12 | 11 | 10.4 |
| 130 | 13 | 7.2 | 22.0 | 15.4 | 10 | 10.6 | 10.2 |
| 140 | 10 | 12.2 | 30.8 | 15.0 | 31 | 7 | 16 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A catalyst composition comprising
   (a) 0.4% to 99.2% by weight of a tertiary amine,
   (b) 0.4% to 98.8% by weight of a tin compound capable of catalyzing the reaction between an isocyanate group and an active hydrogen atom, and
   (c) 0.09% to 99.2% by weight of a compound of the formula:

wherein Me represents calcium or barium, and
   R represents a hydrocarbon group,
   all weight percents being based on the total catalyst compounds present.

2. The composition of claim 1, wherein said tin compound is selected from the group consisting of stannous salts of carboxylic acids having from 1 to 18 carbon atoms, dialkyl tin salts of carboxylic acids having from 1 to 18 carbon atoms, trialkyl tin oxides, dialkyl tin oxides, and dialkyl tin chlorides.

3. The composition of claim 1, wherein R represents an aliphatic group, a cycloaliphatic group, an aryl group, an aralkyl group or an alkaryl group.

4. The composition of claim 1, wherein component (a) comprises (i) N,N-dimethylamino ethanol and (ii) a second tertiary amine selected from the group consisting of triethylenediamine, triethylamine, bis-(β-dimethylamino ethyl) ether and N,N,N',N'-tetramethyl-1,3-butane diamine.

5. The composition of claim 1, wherein said tin compound is stannous octoate.

6. The composition of claim 5, wherein component (a) comprises (i) N,N-dimethylamino ethanol and (ii) a second tertiary amine selected from the group consisting of triethylenediamine, triethylamine, bis-(β-dimethylamino ethyl) ether and N,N,N',N'-tetramethyl-1,3-butane diamine.

7. The composition of claim 6, wherein said compound (c) is barium naphthenate.

8. The composition of claim 1, wherein said compound (c) is selected from the group consisting of calcium naphthenate, calcium stearate, barium stearate, calcium octoate, barium neodecanoate, barium octoate, barium naphthenate, calcium linoleate and calcium neodecanoate.

9. A catalyst composition comprising
   (a) 0.4% to 99.2% by weight of a tertiary amine,
   (b) 0.4% to 98.8% by weight of a tin compound capable of catalyzing the reaction between an isocyanate group and an active hydrogen atom, and
   (c) 0.09% to 99.2% by weight of barium acetylacetonate,
   all weight percents being based on the total catalyst compounds present.

* * * * *